United States Patent [19]
Montanaro et al.

[11] Patent Number: 5,098,352
[45] Date of Patent: Mar. 24, 1992

[54] DISENGAGEABLE FOUR-WHEEL-DRIVE TRANSMISSION SYSTEM FOR MOTOR VEHICLES

[75] Inventors: Enrico Montanaro, Grugliasco; Felice Garrone, Turin, both of Italy

[73] Assignee: Fiat Auto S.p.A., Turin, Italy

[21] Appl. No.: 593,429

[22] Filed: Oct. 5, 1990

[30] Foreign Application Priority Data

Oct. 10, 1989 [IT] Italy ............... 67868 A/89

[51] Int. Cl.⁵ .................. F16H 37/08; F16H 1/44.5
[52] U.S. Cl. ............................ 475/86; 475/150; 475/200
[58] Field of Search ............ 475/84, 86, 150, 200, 475/206, 221

[56] References Cited

U.S. PATENT DOCUMENTS

| | | | |
|---|---|---|---|
| 3,845,671 | 11/1974 | Sharp et al. | 475/150 |
| 4,718,301 | 1/1988 | Friedrich | 475/206 |
| 4,784,236 | 11/1988 | Bausch et al. | 475/221 X |
| 4,802,383 | 2/1989 | Katayama et al. | 475/221 X |
| 4,815,336 | 3/1989 | Katayama et al. | 475/221 X |
| 4,862,769 | 9/1989 | Koga et al. | 475/86 |
| 4,966,249 | 10/1990 | Imaseki | 475/86 X |

Primary Examiner—Dwight Diehl
Attorney, Agent, or Firm—Sughrue, Mion, Zinn, Macpeak & Seas

[57] ABSTRACT

A disengageable four-wheel-drive transmission system for motor vehicles with transverse gearbox includes a gradually-engageable hydraulic clutch controlled automatically by an electronic control unit in dependence on operating parameters including the torque transmitted by the engine of the vehicle at the time in question. The electronic control unit is arranged to cause the clutch to be engaged gradually from a disengaged condition in which the drive is transmitted from the gearbox only to the front differential or the rear differential of the transmission system.

10 Claims, 8 Drawing Sheets

DISENGAGEABLE FOUR-WHEEL-DRIVE TRANSMISSION SYSTEM FOR MOTOR VEHICLES

BACKGROUND OF THE INVENTION

The subject of the present invention is a disengageable four-wheel-drive transmission system for a motor vehicle with a transverse gearbox, including a toothed input member meshed with a toothed output member of the gearbox, a front differential which drives the drive shafts of the front wheels of the vehicle, a rear differential which drives the drive shafts of the rear wheels of the vehicle, and means for distributing the torque between the front and rear differentials.

In four-wheel-drive transmission systems of the type defined above, the means for distributing the torque are usually constituted by an epicyclic differential, possibly in association with a FERGUSON-type sliding viscous coupling, a TORSEN-GLEASON distributor, or the like. These known transmission systems do not enable the four-wheel drive to be disengaged selectively when it is not necessary or desired, so as to limit the transmission of torque to the front wheels of the vehicle only or to the rear wheels only. Moreover, the torque is distributed between the front and rear differentials in proportions which are fixed or which can be varied only in proportion to any variations in the road-holding of the front and rear wheels.

SUMMARY OF THE INVENTION

The object of the present invention is to provide a four-wheel-drive transmission system of the type defined above which can be engaged or disengaged selectively in order to limit the drive either to the front wheels of the vehicle or to the rear wheels and which, in the four-wheel-drive condition, can distribute the transmitted torque to the front and rear wheels in dependence on the prevailing operating parameters of the transmission system and, in particular, on the torque transmitted by the engine of the vehicle.

According to the invention, this object is achieved by virtue of the fact that the torque-distributing means of the transmission are constituted by a hydraulic clutch which can be engaged and disengaged gradually and which is operatively associated with an electronic control unit arranged to pilot the gradual engagement of the clutch automatically in dependence on operating parameters of the transmission system, starting from a disengaged condition in which the drive is transmitted only to the front or the rear differential.

Within the scope of this general concept, the invention provides for various embodiments which enable the drive to be transmitted to the front differential only or to the rear differential only when the hydraulic clutch is in the disengaged condition.

According to the invention, the electronic control unit is arranged to pilot the operation of the hydraulic clutch in dependence on the instantaneous torque transmitted by the engine of the vehicle.

According to a preferred embodiment of the invention, this is achieved by virtue of the fact that the toothed input member of the transmission system and the toothed output member of the gearbox each have helical teeth, and the fact that the input member of the transmission system is supported for rotation by the gearbox housing by means of an axial rolling bearing with a portion which is resiliently deformable in dependence on the axial load transmitted by the helical teeth and which has an associated deformation transducer operatively connected, to the electronic control unit and adapted to supply thereto electrical signals indicative of the deformation of the deformable portion of the bearing. The electronic unit pilots the gradual engagement and disengagement of the hydraulic clutch in dependence on the electrical signals supplied by the deformation transducer.

The axial bearing conveniently has an outer race which is mounted with clearance relative to the gearbox housing and has an outer annular projection clamped axially relative to the housing and constituting the resiliently deformable portion with which one or more extensometers are associated.

BRIEF DESCRIPTION OF THE DRAWINGS

The invention will now be described in detail with reference to the appended drawings, provided purely by way of non-limiting example, in which:

FIG. 8 is a variant of FIG. 5, and FIGS. 9 and 10 are views similar to FIGS. 1 and 3, showing a third embodiment of the invention.

DETAILED DESCRIPTION OF THE INVENTION

Figure 1:
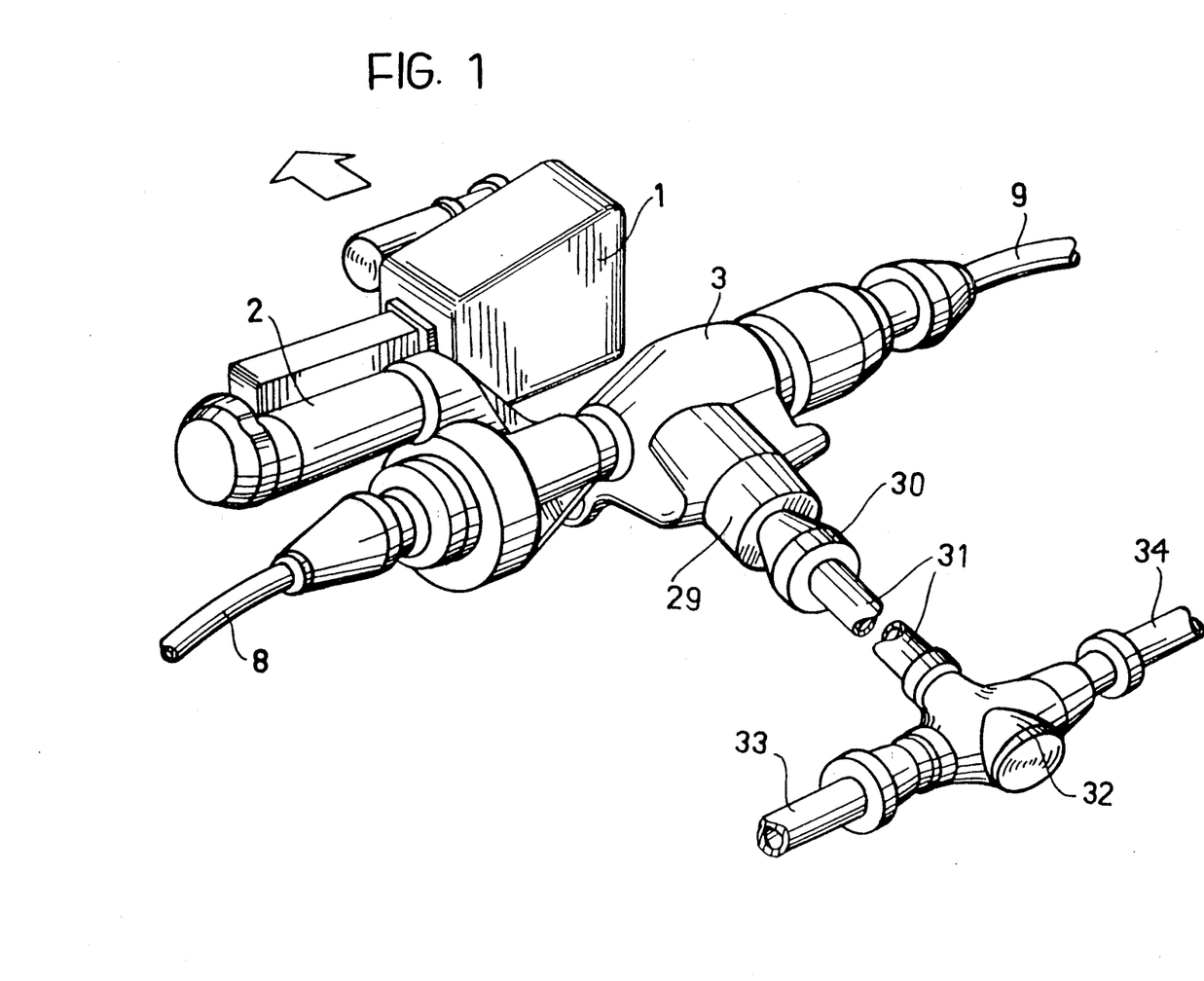
FIG. 1 is a schematic perspective view of a disengageable four-wheel-drive transmission system according to the invention.
Figure 2:
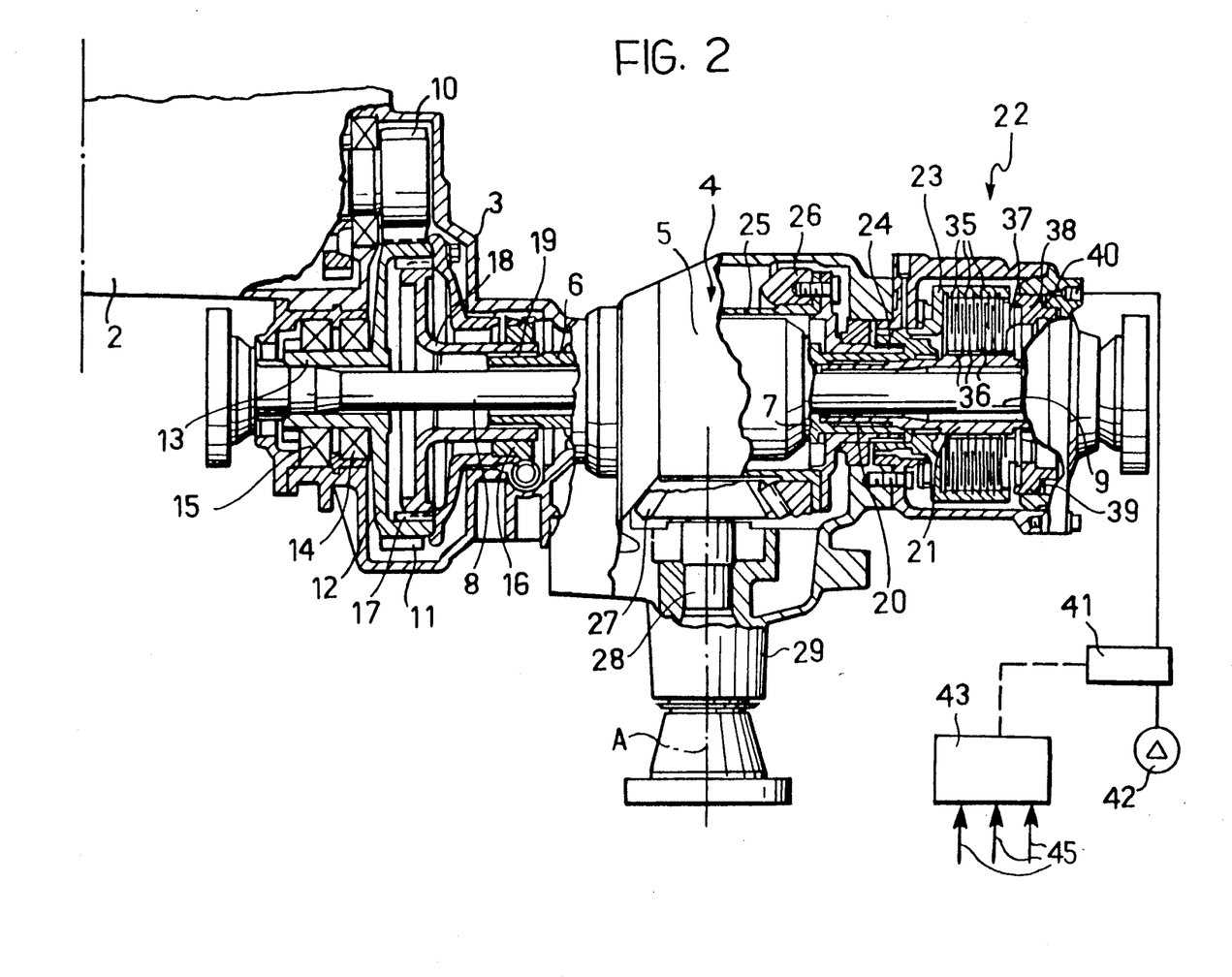
FIG. 2 is a sectional view of part of a first embodiment of the transmission system on an enlarged scale.
Figure 3:
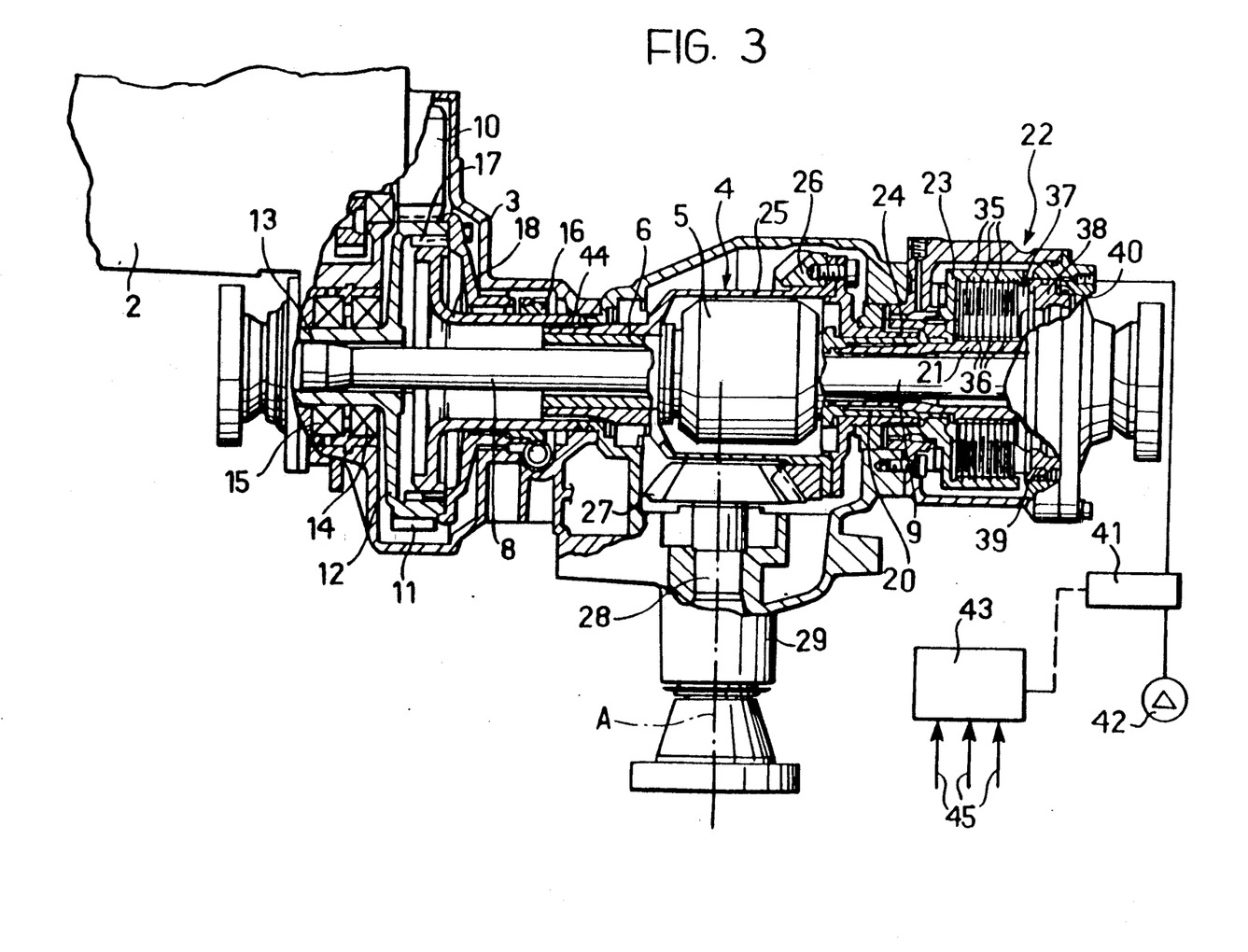
FIG. 3 is a view similar to FIG. 1, showing a second embodiment of the transmission system.
Figure 4:
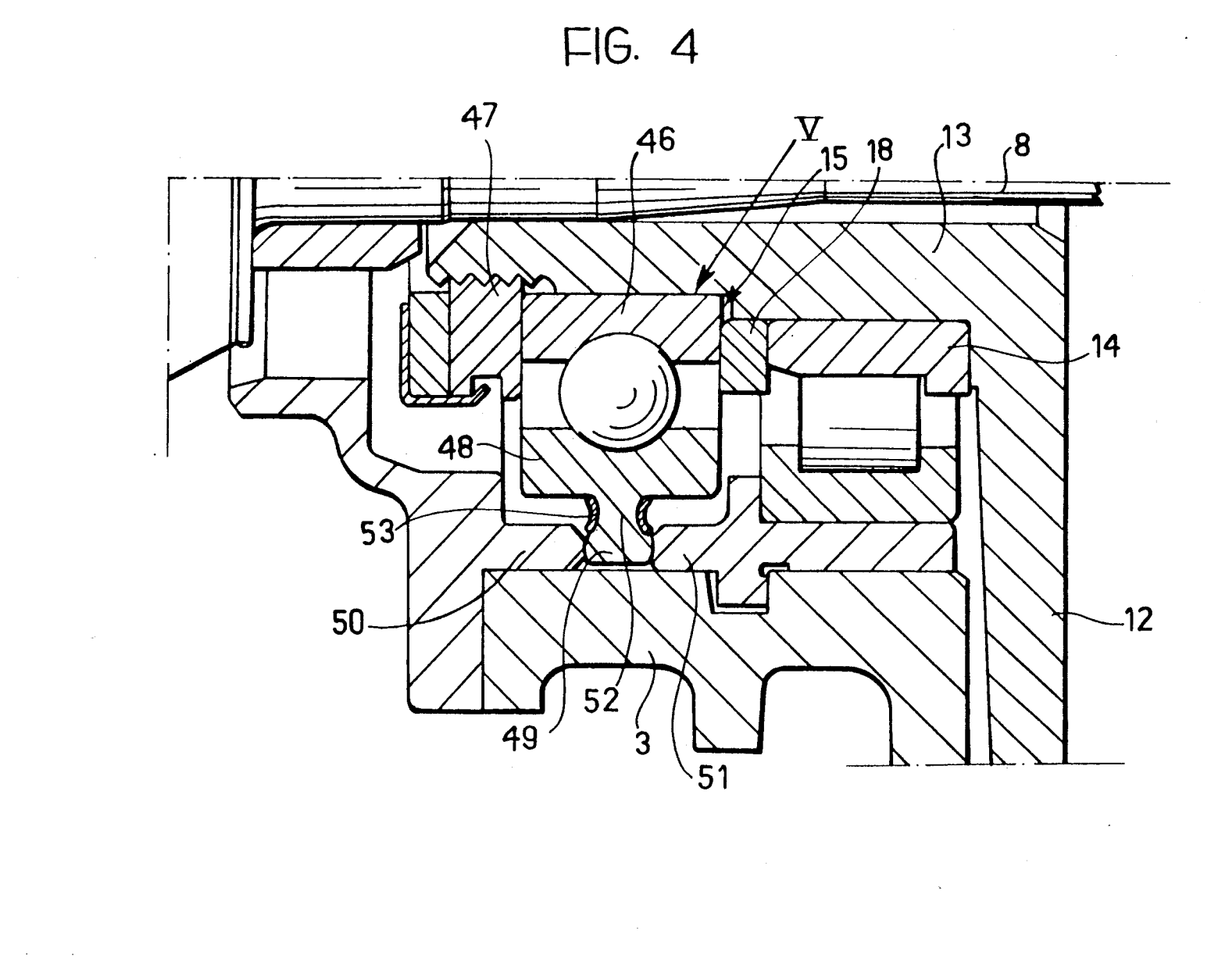
FIG. 4 shows a detail of FIGS. 2 and 3, on an enlarged scale, FIG. 5 a partial cross-section of the detail indicated by the arrow V in FIG. 4.
Figure 5:
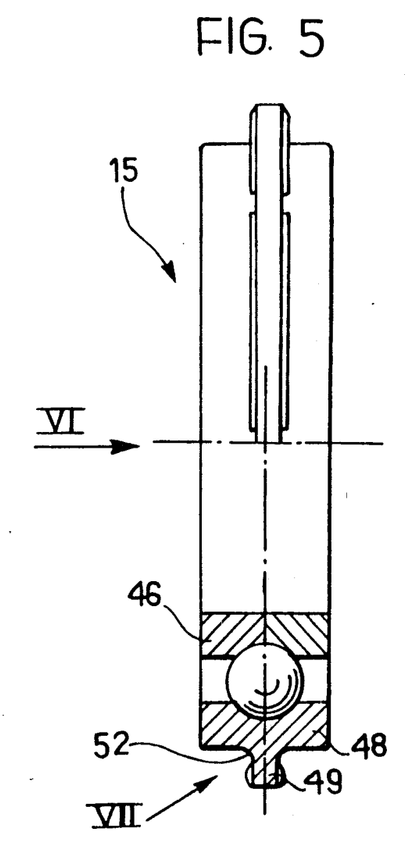
Figure 6:
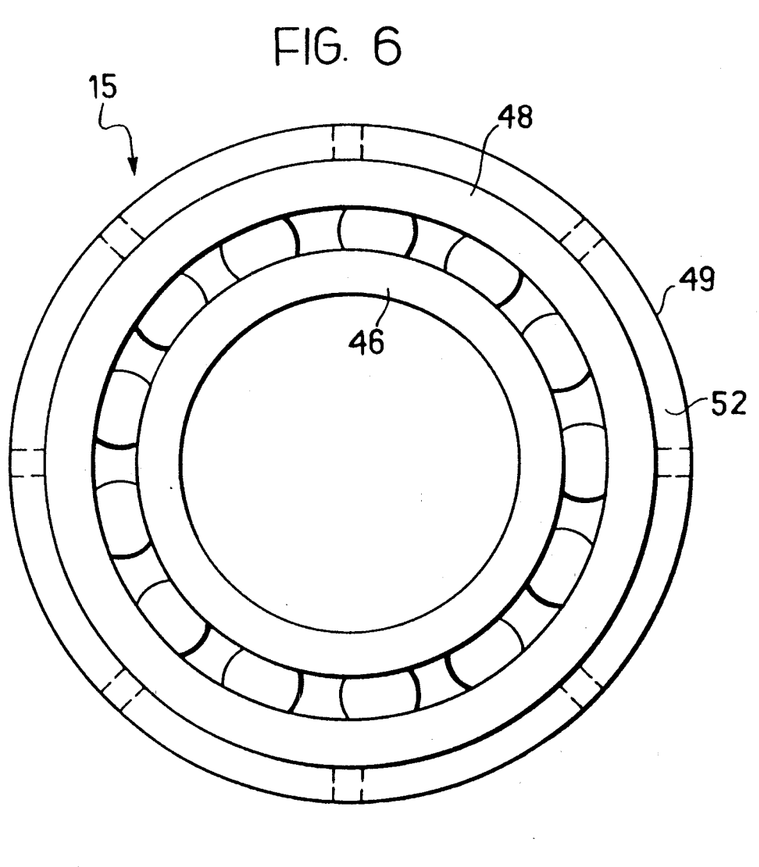
FIG. 6 is a front elevational view taken on the arrow VI of FIG. 5, FIG. 7 the detail indicated by the arrow VII in FIG. 5, on an enlarged scale.
Figure 7:
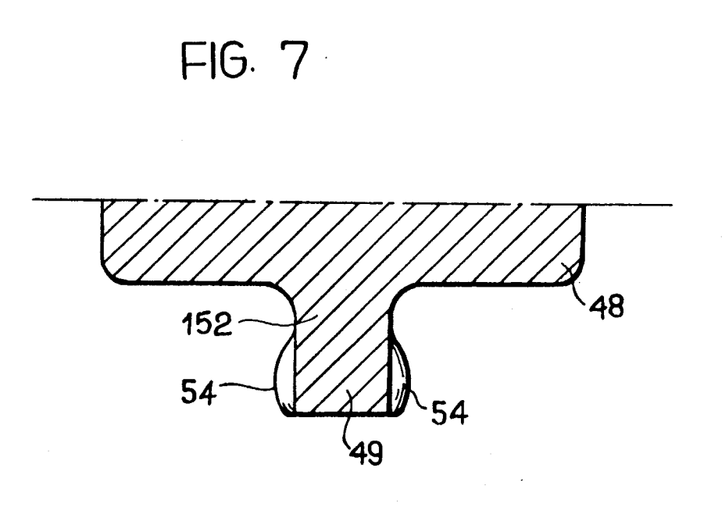

With reference initially to FIG. 1, an internal combustion engine, schematically indicated 1, is intended for mounting in the front part of a motor vehicle with its axis arranged transverse the length of the vehicle, indicated A in FIGS. 2 and 3. The engine 1 has a gearbox 2 with a main shaft and a countershaft (not shown) which are also arranged transverse the length A of the vehicle.

A housing is indicated 3 and houses a generally conventional differential 4, shown in FIGS. 2 and 3, whose box 5 has two opposed tubular appendages 6, 7 from which the drive shafts 8, 9 of the front wheels of the vehicle project.

With reference in greater detail to FIG. 2, a helical gear, indicated 10, is carried by the countershaft of the gearbox 2 and meshes with an external helical ring gear 11 carried by a wheel 12 having a tubular hub 13 which is supported for rotation by the housing 3, coaxially with the drive shaft 8, by means of a radial rolling bearing 14 and an axial rolling bearing 15 which will be referred to again below.

The wheel 12 is coupled for rotation with a sprocket 16 used for driving a revolution-counter and has an internal ring gear 17 meshed with a hollow toothed member 18 which is permanently coupled at 19 for rotation with the tubular appendage 6 of the box 5 of the front differential 4.

The other tubular appendage 7 of the box 5 of the front differential 4 is permanently coupled at 20 for rotation with a tubular element 21 which extends coaxially with the other front drive shaft 9 and constitutes a first entrainment member of a hydraulic clutch, generally indicated 22, which is also housed in the housing 3.

The hydraulic clutch 22 also includes a drum 23 which constitutes a second entrainment member and is supported for rotation by the first entrainment member 21. The drum 23 is coupled permanently at 24 for rotation with a hollow member, generally indicated 25, which contains the front differential 4 and is supported for free rotation by the housing 3, coaxially with the tubular appendages 6 and 7.

A bevel gear 26 is fixed to the hollow member 4 and is meshed with a bevel pinion 27 at the inner end of a shaft 28 supported for rotation within a hollow appendage 29 of the housing 3, arranged along the length A of the vehicle. The opposite end of the shaft 28 from the bevel pinion 27 is connected by means of a constant velocity universal joint, generally indicated 30 in FIG. 1, to a propeller shaft 31 for transmitting the torque to a rear differential 32. The differential 32 transmits the torque to the drive shafts 33, 34 of the rear wheels of the vehicle.

With reference again to FIG. 2, the hydraulic clutch 22 includes two sets of friction discs 35, 36 coupled alternately for rotation with the first entrainment member 21 and the second entrainment member 23 and axially slidable relative thereto. A thrust disc 37 is associated with the discs 35, 36 and can be moved axially by a piston 38 which is sealingly slidable in a cylinder 39 defining a thrust chamber 40 connected by means of a distributor, schematically indicated 41, to a supply 42 of pressurised hydraulic fluid.

The distributor 41 is controlled automatically by means of an electronic control unit 43, in the manner explained below, so as to keep the chamber 40 of the hydraulic clutch 22 discharged or to connect the thrust chamber 40 gradually to the supply 42. In the first case, the hydraulic clutch 22 is disengaged so that the friction discs 35 and 36, and hence the first entrainment member 21 and the second entrainment member 23, and freely rotatable relative to each other. Consequently, in this condition, the rotation of the output gear 10 of the gearbox is transmitted solely to the front differential 4 and not to the bevel gears 26-27, or hence to the rear differential 32, so that the transmission system only drives the front wheels.

In the second case, the rotation of the first entrainment member 21 of the hydraulic clutch 22 is also transmitted to the second entrainment member 23, and hence to the rear differential 32 by means of the hollow member 25, the bevel gears 26, 27 and the shafts 28 and 31, in proportion to the coupling force between the friction discs 35, 36. The transmission system thus achieves four-wheel drive with a distribution between the front and rear wheels which is variable up to a maximum of 50% when the hydraulic clutch 22 is in the fully-engaged condition and the coefficient of friction and the weight of the axles are uniform.

The variant shown in FIG. 3 is generally similar to the embodiment described above with reference to FIG. 2 and only the differences will be described in detail with the use of the same reference numerals for identical or similar parts.

In this variant, the toothed member 18 which meshes with the internal ring gear 17 that receives the drive from the output gear 10 of the gearbox by means of the external ring gear 11 is coupled permanently at 44 for rotation with the hollow body 25 instead of with the tubular appendage 6 of the front differential 4 as in the version of FIG. 2. Thus, when the hydraulic clutch 22 is disengaged, the rotation of the output gear 10 is transmitted entirely by the hollow body 25 to the second entrainment member 23 of the hydraulic clutch 22 and to the bevel gears 26, 27, and hence to the rear differential 32 by means of the shafts 28 and 31. The transmission system thus drives only the rear wheels of the vehicle.

The gradual engagement of the hydraulic clutch 22 by means of the control 43 causes the drive also to be transmitted, in a correspondingly variable proportion, to the first entrainment member 21 of the clutch 22 and hence, by means of the tubular appendage 7, to the box 5 of the front differential 4 which distributes it to the front wheels. When the clutch 22 is in the fully-engaged condition, the transmission system distributes 50% of the drive to the front wheels and 50% to the rear wheels if the coefficient of friction and the weight on the axles are uniform.

Figure 9:
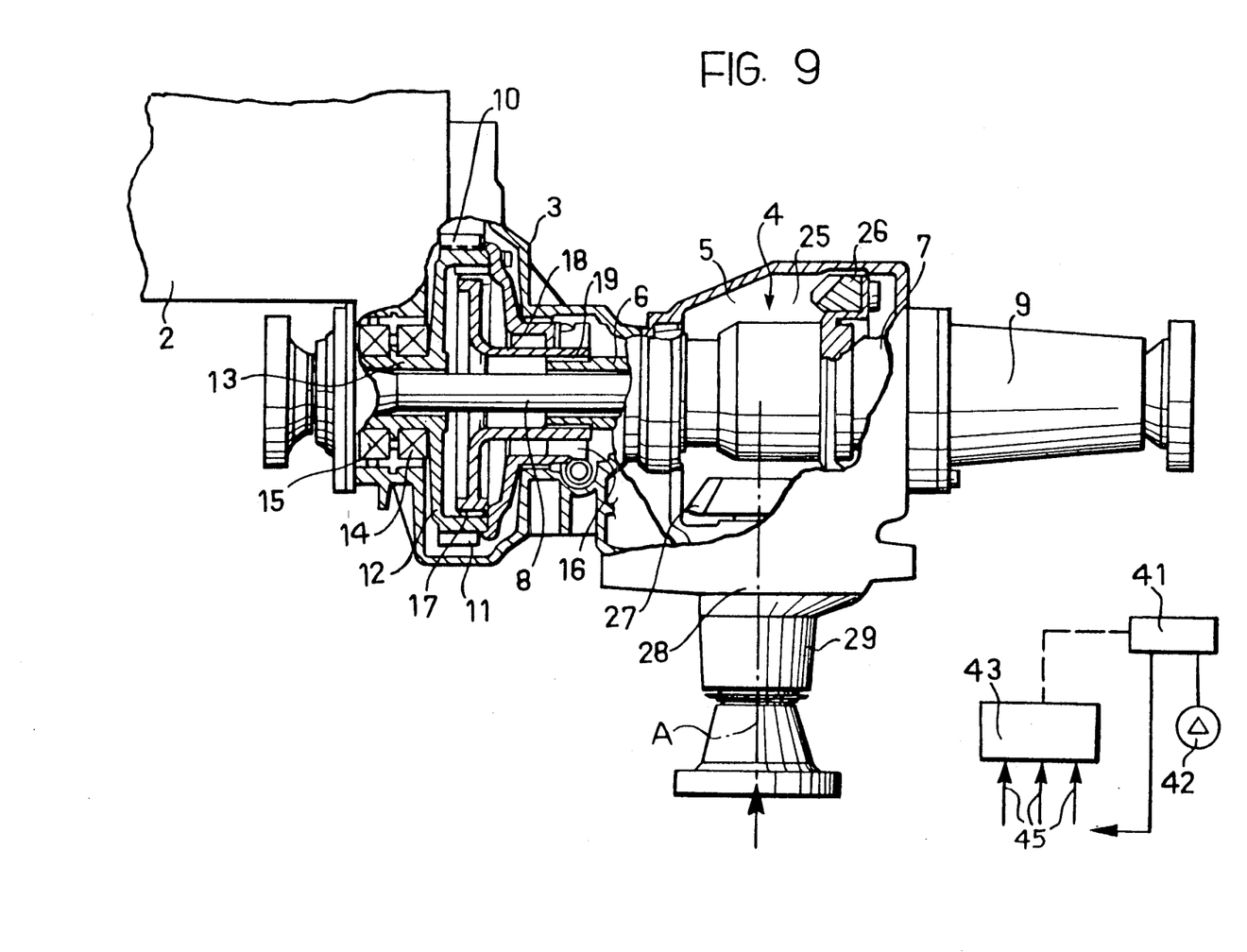
Figure 10:
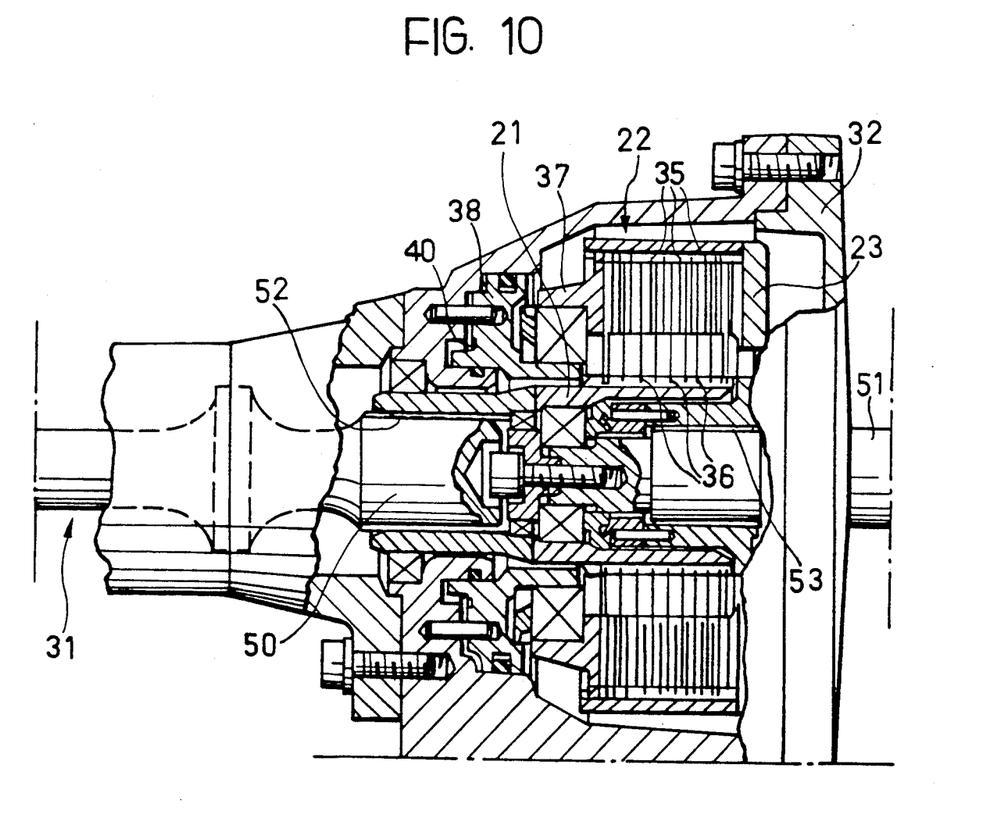

The variant shown in FIGS. 9 and 10 is also generally similar to the embodiments described above and only the differences will be described in detail, the same reference numerals being used for identical or similar parts.

In this variant, the hydraulic clutch 22 is arranged near the rear differential 32 instead of beside the front differential 4. The bevel pinion 27 carried by the shaft 28 is permanently rotated by the bevel ring gear 26 which is fixed to the box 5 of the front differential 4. This box 5 is in turn coupled permanently at 19, by its tubular appendage 6, for rotation with the hollow toothed member 18 which is rotated by the output gear 10 of the gearbox 2, as in the embodiments described above.

As shown in detail in FIG. 10, near the rear differential 32, the transmission shaft 31 which is coupled for rotation with the shaft 28 is formed with two coaxial portions 50, 51 which can be connected together for rotation and disconnected by the hydraulic clutch 22. The portion 51 constitutes the input member of the rear differential 32.

The first entrainment member 21 of the clutch 22 is coupled at 52 for rotation with the portion 50 of the shaft 31, whilst the second entrainment member 23 is coupled at 53 for rotation with the other portion 51 of the shaft 31.

The operation of the hydraulic clutch 22, which is controlled by the electronic control unit 43 through the distributor 41, is identical to that described above.

In operation, when the hydraulic clutch 22 is disengaged, the portion 51 of the shaft 31 is disconnected from the portion 50 so that the rotation of the output gear 10 of the gearbox 2 is not transmitted to the rear differential 32 and the transmission system therefore drives only the front wheels of the vehicle.

As the hydraulic clutch 22 is gradually engaged by means of the control unit 43, the drive is transmitted in a correspondingly variable proportion from the portion 50 to the portion 51, and hence to the rear differential 32 which distributes it to the rear wheels. When the clutch 22 is in the fully-engaged condition, the transmission system distributes 50% of the drive to the front wheels and 50% to the rear wheels if the coefficient of friction and the weight on the axles of the vehicle are uniform.

In the three embodiments of FIGS. 2, 3 and 9-10, the engagement and disengagement of the hydraulic clutch 22 is achieved gradually by the electronic control unit 43 in dependence on operating parameters of the transmission system and of the vehicle in which it is fitted, by means of suitable inputs 45 supplied with signals generated by corresponding sensors and indicative of these parameters.

These parameters, which may comprise, for example, the speed at which the vehicle is moving, the difference in the rates of rotation of the front and rear axles, the rate of rotation of the engine, environmental data, and travelling conditions (dry, wet or snowy ground) also include, according to the invention, the torque delivered, at the time by the engine, in the driving condition or in the coasting condition.

In order to obtain and supply to the electronic control unit 43 an electrical signal indicative of the torque at a particular time, the invention provides the device shown in greater detail in FIGS. 4 to 7. This consists of a particular conformation of the axial rolling bearing 15 which, as stated, together with the radial rolling bearing 14, rotatably supports the tubular hub 13 of the wheel 12 carrying the external helical ring gear 11 which is meshed with the helical output gear 10 of the gearbox 2. This bearing 15 includes an inner race 46 which is clamped axially between a ring nut 47 screwed onto the tubular hub 13 and a spacer 58 interposed between the bearing 15 and the bearing 14 and an outer race 48 which is mounted with clearance relative to the housing 3 of the gearbox 2. The outer race 48 has an external annular projection 49 which is clamped axially between a stop 50 of the housing 3 and a spacer 51 and is connected to the outer race 48 by means of a resiliently deformable portion 152. Deformation transducers constituted, for example, by extensometers 53 are mounted on the resiliently deformable portion 152 and are connected electrically to the electronic control unit 43. As shown in greater detail in FIG. 7, the annular projection 49 has rounded sides 54 which are in contact with the corresponding surfaces of the appendage 50 and the spacer 51 and may have gaps locally.

Figure 8:
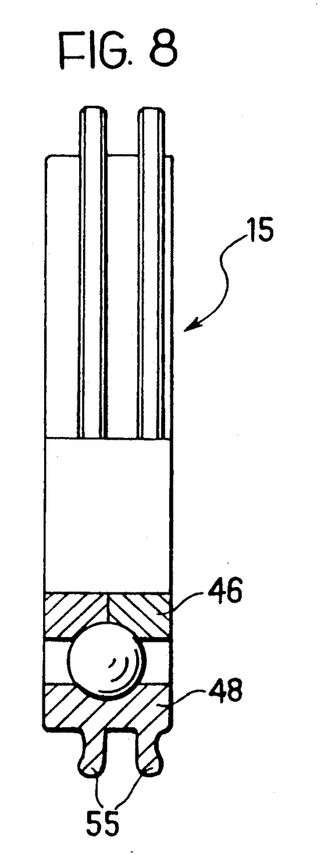

There may be two annular projections 49 rather than one, as in the embodiment of FIGS. 4 to 7, and they may have an asymmetrical configuration, as indicated 55 in the variant of FIG. 8.

When the transmission system is in operation, the variations in the torque delivered by the engine of the vehicle and transmitted through the gears 10 and 11 by virtue of the helical teeth of the gears 10 and 11, in driving and coasting conditions, generate axial forces on the tubular hub 13, and hence on the bearing 15, as a result of which the portion 52 connecting the inner race 48 to its annular projection 49 is deformed resiliently. The deformations are detected by the extensometers 53 which provide the electronic control unit 43 with corresponding electrical signals which are processed by the unit 43 and used moment by moment for making corrective adjustments to the degree of engagement-disengagement of the hydraulic clutch 22 and hence to the distribution of the torque between the front and rear axles.

We claim:

1. A disengageable four-wheel-drive transmission system for a motor vehicle having front and rear wheel drive shafts and a transverse gearbox with a toothed output member, including a toothed input member meshed with the toothed output member of the gear box, a front differential which drives the drive shafts of the front wheels of the vehicle, a rear differential which drives the drive shafts of the rear wheels of the vehicle, and means for distributing the torque between the front and rear differentials constituted by a hydraulic clutch which can be engaged and disengaged gradually and which is operatively associated with an electronic control unit arranged to pilot the gradual engagement of the hydraulic clutch automatically in dependence on operation parameters of the transmission system, starting from a disengaged condition in which the drive is transmitted from the gearbox to only one of the said front and rear differentials in order to control the distribution of the torque between the front and rear axles, wherein the front differential includes a box and the drive shafts of the wheels project from opposite sides therein and wherein the one side of the box of the front differential is coupled permanently to the toothed input member of the transmission system, wherein the hydraulic clutch includes first and second coaxial entrainment members and friction discs coupled alternately to the two entrainment members, and wherein the first entrainment member is coupled permanently for rotation with the other side of the box of the front differential and a toothed output member for transmitting the drive to the rear differential is coupled permanently for rotation with the second entrainment member so that, when the hydraulic clutch is disengaged, the drive is transmitted from the gearbox to only the front differential.

2. A transmission system according to claim 1, in which the front differential includes a box and the drive shafts of the front wheels project from opposite sides thereof, wherein the hydraulic clutch includes first and second coaxial entrainment members and friction discs coupled alternately to the entrainment members, and wherein the first entrainment member is coupled permanently for rotation with the casing of the front differential and the second entrainment member is coupled permanently for rotation with the toothed input member of the transmission system by means of a hollow element which surrounds the front differential coaxially, a toothed output member for transmitting the drive to the rear differential being coupled permanently for rotation with the second entrainment member so that, when the hydraulic clutch is in the disengaged condition, the drive is transmitted from the gearbox to the rear differential only.

3. A transmission system according to claim 1, in which the front differential includes a box and the drive shafts of the front wheels project from opposite sides thereof, wherein the box of the front differential is coupled permanently for rotation with the toothed input member of the transmission system as well as with a toothed output member for transmitting the drive to the rear differential by means of a longitudinal propeller shaft having a first portion which is driven by the toothed output member and a second portion for driving the rear differential, wherein the hydraulic clutch includes first and second coaxial entrainment members and friction discs coupled alternately to the two entrainment members, the two entrainment members being coupled permanently for rotation with the first and second portions of the longitudinal shaft respectively, so that, when the hydraulic clutch is in the disengaged condition, the drive is transmitted from the gearbox to the front differential only.

4. A transmission system according to claim 1, wherein the electronic control unit is arranged to pilot the operation of the hydraulic clutch in dependence on the instantaneous torque delivered by the engine of the vehicle.

5. A transmission system according to claim 4, wherein the toothed input member of the transmission system and the toothed output member of the gearbox each have helical teeth, and the input member is supported rotatably by the housing of the gearbox by means of an axial rolling bearing with a portion which is resiliently deformable in dependence on the axial load transmitted by the helical teeth and which has an associated deformation transducer operatively connected to the electronic control unit and adapted to supply thereto electrical signals indicative of the deformation of the deformable portion of the axial bearing.

6. A transmission system according to claim 5, wherein the axial bearing has an outer race which is mounted with clearance relative to the housing of the gearbox and has at least one external annular projection clamped axially relative to the housing and defining the resiliently deformable portion.

7. A transmission system according to claim 5 wherein the deformation transducer is constituted by extensometers.

8. A transmission system according to claim 6, wherein there is a single annular projection.

9. A transmission system according to claim 6, wherein there are two annular projections.

10. A transmission system according to claim 6, wherein the or each annular projection has rounded sides.

* * * * *